Dec. 9, 1958  H. R. NORDIN  2,863,167
STUFFING MECHANISM FOR SAUSAGE AND LIKE CASINGS
Filed Aug. 1, 1956
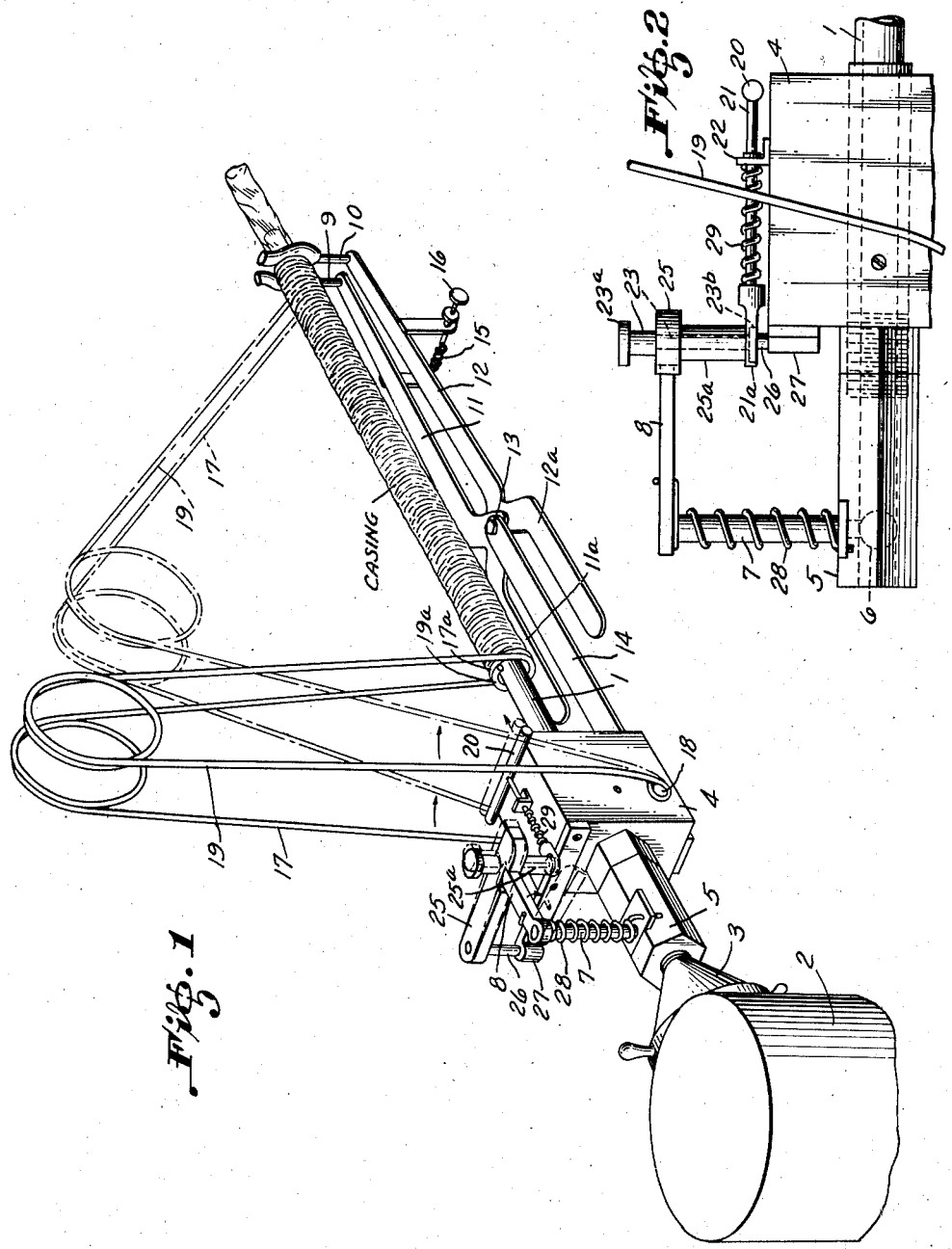
INVENTOR
H. R. Nordin
BY Maybee & Legris
ATTORNEYS

United States Patent Office 2,863,167
Patented Dec. 9, 1958

2,863,167

STUFFING MECHANISM FOR SAUSAGE AND LIKE CASINGS

Henry Randolph Nordin, Concord, Ontario, Canada, assignor to Canada Packers Limited, Toronto, Ontario, Canada Application August 1, 1956, Serial No. 601,580

11 Claims. (Cl. 17—41)

This invention relates to a stuffing mechanism for sausage and the like casings. The preparation of comminuted meats for sale is becoming an increasingly important part of the meat processor's business. The meats are generally ground and then chopped in a high speed chopping device or cutter. This cutter serves also to blend meat with cereals and spices. There are of course many blends and processing techniques, which produce the great variety of products which the public demands.

One of the most important processing techniques is to stuff the comminuted meat blend into casings either natural or synthetic, followed by smoking, cooking, or both. In some cases, such as fresh sausages, no processing is used. In the stuffing of meats into casings the usual procedure is to place a blended mixture into a device called a stuffer. A large piston, usually operated by air under pressure, then extrudes the mixture through a long tube called a horn. Appropriate valves allow the operator to start or stop the stuffer as desired. A casing is placed over the horn. As the filling material is extruded, it then passes into the casing. The pressure applied to the filling material by the stuffer causes the casing to peel off the horn. The extent to which a casing is stuffed is regulated by the operator, who restricts the rate at which the casing comes off the horn by applying pressure to the casing with the fingers. This method of controlling the density of the stuffing is at best a crude one. Its accuracy depends on the operator's ability to maintain the desired pressure on the casing constantly.

Uniformity of product has taken on a new importance as more and more prepackaged meats are being sold. For example, a one pound package of wieners which is to contain ten wieners should weigh as close to one pound as possible. Large variations in the weight of the wieners would tend to produce some packages grossly overweight and some underweight. Manual stuffing does not produce a product of sufficient uniformity to be packaged without careful selection of wieners, unless the manufacturer is willing to give away a substantial amount of product as a sort of safety margin. This will be dealt with in greater detail hereafter. Manual stuffing is a tedious, monotonous task which requires the constant attention of an operator.

The object of this invention is to produce a mechanical stuffing device which will eliminate the difficulties mentioned above. This object is attained by the provision of apparatus for controlling the passage of the casing along and off the horn comprising mechanical means adapted to engage the casing adjacent one end of its folded portion to regulate the passage of the casing off the horn, mechanical means adapted to engage the casing at a position spaced from the discharge end of the horn and means to urge it along the horn toward the said regulating means. This apparatus makes it possible to stuff casings with such precision as to eliminate the necessity of weighing the product into packages. By adjusting the spring tension of the regulating means it is possible to stuff the casing to any degree desired. One man can handle several stuffers. His task will be to slip the casings onto the horn. The stuffer will then fill the casing to the degree desired, and by providing an automatic shut off, the mechanism can be cut off when the casing is filled, making it only necessary to place another casing on the horn and reset the mechanism for another operation.

Modern methods of preparing and mixing stuffing materials make it possible to produce batches of filling material of great uniformity. Thus the only appreciable variation in weight of the finished product results from variations in density of the sutffing, which this invention is intended to overcome.

One form of the invention is shown in the enclosed drawings in which:

Figure 1 is a perspective showing the mechanism mounted on a horn attached to a stuffer of standard construction; and Figure 2 is a side view on a slightly larger scale of the automatic cuttoff mechanism.

In the drawings corresponding parts are referred to by corresponding numerals.

The horn 1 is attached to a stuffer 2 in the usual manner by means of a ring 3. The horn 1 extends through and is secured to a block 4 which serves to support the mechanism hereafter described. Secured to the inner or inlet end of the horn 1 and interposed between said horn and the suffer is a valve 5 having a valve member 6 for opening and closing the passage from the stuffer 2 to the horn 1, said valve having a stem 7 and an operating lever 8 which is automatically operated as hereafter described.

The casing may be of natural or synthetic material such as are used for sausages, wieners, bologna, and other stuffed meat products. The invention is described in connection with a standard wiener casing of cellulosic material such as is commonly used in the trade. These casings are folded or compressed in accordion style, i. e., in the form that would be obtained by threading the casing over a rod of somewhat smaller diameter than the diameter of the casing and pushing the casing onto the rod until it is in the form of a comparatively short folded length, which can be slipped over the horn of the stuffer as shown in Figure 1.

Apparatus for controlling the passage of the casing along and off the horn will now be described.

Having mounted the casing on the horn, a short end will remain or will be pulled over the other or discharge end of the horn and spring pressed fingers 9 and 10 will then engage the casing just in front of the folded portion thereof, and press the casing into engagement with the end of the horn. These fingers are constructed of 3/16" wire formed to embrace the discharge end of the horn on opposite sides and are preferably encased in rubber or similar soft and somewhat resilient material.

The fingers 9 and 10 are mounted on arms 11 and 12 respectively, having handles 11a and 12a respectively, and pivoted at 13 to a support 14 which extends outwardly from the block 4. By pressing handles 11a and 12a together the arms may be separated to move fingers 9 and 10 out of engagement with the horn. Tension spring 15 extends between the arms 11 and 12 and tends to draw the arms 11 and 12 together and thus cause the fingers 9 and 10 to engage the end of the horn. The tension of spring 15 may be adjusted by means of tensioning screw 16.

It has been found that the spring pressed fingers 9 and 10 alone are not sufficient to regulate the consistency of the material in the casing and, moreover, using the fingers 9 and 10 alone, there is a tendency for the casing to come off the end of the horn unevenly and to stretch and tear adjacent the inner side of the fingers 9 and 10.

To overcome this difficulty, spring pressed means are provided for engaging the casing at a point spaced from the end of the horn and constantly urging it along the horn towards the spring fingers 9 and 10 which regulate the passage of the casing off the end of the horn.

This spring pressed means comprises a ring 17a which encircles the horn adjacent the block 4 and behind the rear end of the casing. The ring 17a is formed by a loop at the end of the downwardly extending portion of a bent resilient wire 17 which is pivoted to the block 4 and extends upwardly, is looped, and then extends downwardly and is again looped to form the ring 17a mentioned above. Preferably two such springs are utilized, the second being indicated by the numeral 19 in the drawing. Like the spring 17, the spring 19 has an end which is looped around the horn to form a ring 19a. Shown in chain dotted lines are the springs 17 and 19 in their extended position just before the casing passes off the end of the horn and the feed of the material from the stuffer is cut off.

The means for cutting off the stuffer when the casing comes to an end is illustrated in Figures 1 and 2, the dotted lines in Figure 1 showing the position of the parts when the cut-off mechanism is actuated. As the springs 17 and 19 reach the extended position shown in chain dotted lines, the inner or rear portion of the springs will engage cross bar 20 and move it to the dotted line position shown in Figure 1. Bar 20 is mounted on rod 21 slidable in bracket 22 mounted on the block 4 and having an eye 21a at its end. Extending through this eye is a pin 23 rotatably supported on latch 25 and having a knob 23a by which it may be rotated. Pin 23 is journalled in sleeve 25a which depends from latch 25. As shown in dotted lines in Figure 2 pin 23 has an eccentric 23b mounted within the eye 21a. Latch 25 is pivoted on pin 26 which is secured to bracket 27, which in turn is secured to the block 4.

The latch 25 is provided with a notch 25a which receives the end of the valve arm 8. A spring 28 surrounding the valve stem 7 tends to rotate the valve to closed position when the latch 25 is retracted by engagement of the springs 17 and 19 on the cross-bar 20. Thus, as the springs 17 and 19 reach their outermost position, as shown in dotted lines in Figure 1, the valve is operated to automatically cut-off the flow of sausage material to the casing.

Spring 29 on rod 21 normally retains the crossbar 20 in retracted or solid line position and latch 25 in engagement with valve lever 8. By turning the knob 23a and hence turning the eccentric 23b, the rod 21 may be moved axially to adjust the position of the crossbar 20 relative to the springs 17 and 19, so as to adjust the position at which the cut-off mechanism is actuated.

The operation of the device is as follows:

The springs 17 and 19 are pushed back so that their ends, which surround the horn are near the block 4. At the same time the handles 11a and 12a, which actuate the pivoted arms 11 and 12, on which are mounted the fingers 9 and 10, are squeezed to spread the fingers 9 and 10 apart away from the end of the horn against the tension of spring 15. The operator then places a casing over the horn, releases the spring fingers 9 and 10 so that they will engage the casing, and then releases the springs 17 and 19 when then tend to force the casing along the horn towards the fingers 9 and 10. The operator then sets the valve by engaging the valve lever 8 with the notch on the latch member 25 and this opens the valve and the sausage material is forced out through the horn. The operator gives a slight twist to the end of the casing and holds is momentarily until a portion of the casing is filled with sausage meat. Thereafter the device is fully automatic and the casing is filled with sausage material. This casing, after being filled, is then divided into sections in a known manner so as to form a number of individual wieners, sausages or the like, and these may then be cooked, smoked or otherwise processed if desired.

The automatic stuffing mechanism, above described, is of particular value not only because of the saving in labour, but also because of the saving in loss of material because of deviations in the density of the sausage material which is forced into the casing. This is shown by the following examples:

*Example 1*

Casings from the same lot were stuffed with the same emulsion by the automatic stuffing mechanism and by the usual plant procedure, by which the operator slips the casing onto the horn, opens a valve to allow the sausage emulsion to pass through it, and regulates the stuffing by letting the casing slide through his fingers under pressure. Experience teaches the operator what pressure to apply with his fingers to get the desired degree of stuffing.

A large number of equal lengths were cut from casings stuffed by each of these procedures and weighed. The standard deviations of these weights were calculated and compared with each other. Variation by the usual plant procedure was found to be 2.5 times as great as with the automatic stuffer.

Standard deviation—Plant procedure=4.0%.
Standard deviation—Automatic stuffer=1.6%.

Standard deviation is a measure of the variability of the stuffing, and is obtained by taking the square root of the sum of the squares of the variation from the mean divided by the number of weights observed.

*Example 2*

Casings from the same lot were stuffed with the same emulsion, then smoked in the same smokehouse on the same rack. Finished wieners were then individually weighed. From these weights the standard deviation was calculated and from it was calculated the overage which would be required in a one pound nine wiener package if no more than 2.5% underweight would be tolerated.

| Process | Standard Deviation | Required Overage 9 wiener package |
|---|---|---|
| Plant_____gms__ | 3.5 | 21 |
| Automatic Stuffer_____gms__ | 1.7 | 10 |

In this test, variation with the automatic stuffer was one-half as great as with the regular plant process.

The greater uniformity of sausages and the like stuffed by means of the above-described mechanism, is obtained by controlling the extent to which the casing is stuffed. By changing the pressure on the restricting or control fingers 9 and 10, the extent to which the casing is stuffed can be varied without causing any decrease in the precision of the extent of the stuffing. The following are examples giving the spring pressure of the fingers in grams, the average weight in pounds per inch, and the standard deviation calculated as set forth above in Example 1.

| Spring Pressure | 1,000 gms. | 900 gms. | 800 gms. | 600 gms. | Plant Process |
|---|---|---|---|---|---|
| Av. wt., lbs./in | 0.0196 | 0.0178 | 0.0172 | 0.0161 | 0.0184 |
| Standard deviation | 0.00023 | 0.00025 | 0.00023 | 0.00030 | 0.00072 |

What I claim as my invention is:

1. Stuffing mechanism for sausage and the like casings, comprising a horn through which casing filling material may pass, the horn having an inlet into which the filling material may be fed and an end through which said filling material may be discharged, the horn being adapted to receive over it a length of casing folded accordion style, and apparatus for controlling the passage of the casing along and off the horn, said apparatus comprising first means embracing the horn adjacent its discharge end and adapted to engage the casing adjacent one end of its folded portion to regulate the passage of the casing off the horn during operation of the mechanism, second means at least partially encircling the horn and adapted to engage the casing at a position spaced from said discharge end, and means operatively associated with said second means and adapted to move said second means longitudinally of the horn to urge the casing along the horn towards said first means.

2. Stuffing mechanism for sausage end the like casings, comprising a horn through which casing filling material may pass, the horn having an inlet into which the filling material may be fed and an end through which said filling material may be discharged, the horn being adapted to receive over it a length of casing folded accordion style, and apparatus for controlling the passage of the casing along and off the horn, said apparatus comprising first means embracing the horn adjacent its discharge end and adapted to engage the casing adjacent one end of its folded portion to regulate the passage of the casing off the horn during operation of the mechanism, second means at least partially encircling the horn and adapted to engage the casing at a position spaced from said discharge end, and spring means operatively associated with said second means and adapted to move said second means longitudinally of the horn to urge the casing along the horn towards said first means.

3. Stuffing mechanism for sausage and the like casings, comprising a horn through which casing filling material may pass, the horn having an inlet into which the filling material may be fed and an end through which said filling material may be discharged, the horn being adapted to receive over it a length of casing folded accordion style, apparatus for controlling the passage of the casing along and off the horn, said apparatus comprising first means embracing the horn adjacent its discharge end and adapted to engage the casing adjacent one end of its folded portion to regulate the passage of the casing off the horn during operation of the mechanism, second means at least partially encircling the horn and adapted to engage the casing at a position spaced from said discharge end, and means operatively associated with said second means and adapted to move said second means longitudinally of the horn to urge the casing along the horn toward said first means, means associated with the horn for feeding filling material into said inlet and causing it to pass through the horn and into the casing, and means operated by said second means for stopping the passage of filling material through the horn when the casing has advanced to a predetermined position on the horn.

4. Stuffing mechanism for sausage and the like casings, comprising a horn through which casing filling material may pass, the horn having an inlet into which the filling material may be fed and an end through which said filling material may be discharged, the horn being adapted to receive over it a length of casing folded accordion style, apparatus for controlling the passage of the casing along and off the horn, said apparatus comprising first means embracing the horn adjacent its discharge end and adapted to engage the casing adjacent one end of its folded portion to regulate the passage of the casing off the horn during operation of the mechanism, second means at least partially encircling the horn and adapted to engage the casing at a position spaced from said discharge end, and spring means operatively associated with said second means and adapted to move said second means longitudinally of the horn to urge the casing along the horn toward said first means, means associated with the horn for feeding filling material into said inlet and causing it to pass through the horn and into the casing, and means operated by said second means for stopping the passage of filling material through the horn when the casing passes off the discharge end of the horn.

5. Stuffing mechanism for sausage and the like casings, comprising a horn through which casing filling material may pass, the horn having an inlet into which the filling material may be fed and an end through which said filling material may be discharged, the horn being adapted to receive over it a length of casing folded accordion style, apparatus for controlling the passage of the casing along and off the horn, said apparatus comprising first means embracing the horn adjacent its discharge end and adapted to engage the casing adjacent one end of its folded portion to regulate the passage of the casing off the horn during operation of the mechanism, second means at least partially encircling the horn and adapted to engage the casing at a position spaced from said discharge end, and means operatively associated with said second means and adapted to move said second means longitudinally of the horn to urge the casing along the horn towards first said means, means associated with the horn for feeding filling material into said inlet and causing it to pass through the horn and into the casing, a valve associated with said horn for cutting off the passage of filling material through the horn to the casing, and means controlled by said second means operating the valve to cut off the passage of filling material through the horn when the casing passes off the discharge end of the horn.

6. Stuffing mechanism for sausage and the like casing, comprising a horn through which casing filling material may pass, the horn having an inlet into which the filling material may be fed and an end through which said filling material may be discharged, the horn being adapted to receive over it a length of casing folded accordion style, apparatus for controlling the passage of the casing along and off the horn, said apparatus comprising first means embracing the horn adjacent its discharge end and adapted to engage the casing adjacent one end of its folded portion to regulate the passage of the casing off the horn during operation of the mechanism, second means at least partially encircling the horn and adapted to engage the casing at a position spaced from said discharge end, and means operatively associated with said second means and adapted to move said second means longitudinally of the horn to urge the casing along the horn towards said first means, means associated with the horn for feeding filling material into said inlet and causing it to pass through the horn and into the casing, a valve associated with the horn for cutting off the passage of filling material through the horn to the casing, spring means associated with the valve and tending to close the valve, a latch associated with the valve and normally holding the valve in its open position, and means controlled by said second means to trip the latch and permit the spring means to close the valve when the casing has advanced to a predetermined position on the horn.

7. Stuffing mechanism for sausage and the like casings, comprising a horn through which casing filling material may pass, the horn having an inlet into which the filling material may be fed and an end through which said filling material may be discharged, the horn being adapted to receive over it a length of casing folded accordion style, and apparatus for controlling the passage of the casing along and off the horn, said apparatus comprising spring pressed fingers embracing the horn adjacent its discharge end and adapted to engage the casing adjacent one end of its folded portion to regulate the passage of the casing off the horn during operation of the mechanism, means to regulate the pressure of the fingers on the horn, means at least partially encircling the horn and adapted to engage the casing at a position spaced from said discharge end, and means operatively associated with said last mentioned means and adapted to move said last mentioned means longitudinally of the horn to urge the casing along the horn towards said spring pressed fingers.

8. Stuffing mechanism for sausage and the like casings, comprising a horn through which casing filling material may pass, the horn having an inlet into which the filling material may be fed and an end through which said filling material may be discharged, the horn being adapted to receive over it a length of casing folded accordion style, apparatus for controlling the passage of the casing along and off the horn, said apparatus comprising means embracing the horn adjacent its discharge end and adapted to engage the casing adjacent one end of its folded portion to regulate the passage of the casing off the horn during operation of the mechanism, a spring having a bend intermediate its ends and having one end secured relative to the horn and another end at least partially encircling the horn and adapted to engage the casing at a position spaced from said discharge end and urge the casing towards the embracing means, means associated with the horn for feeding filling material into said inlet and causing it to pass through the horn and into the casing, and means controlled by the spring for stopping the passage of filling material through the horn when the casing is advanced a predetermined distance towards the discharge end of the horn.

9. Stuffing mechanism as claimed in claim 8, in which the expansion of the spring causes it to engage and actuate said stopping means.

10. Stuffing mechanism for sausage and the like casings, comprising a horn through which casing filling material may pass, the horn having an inlet into which the filling material may be fed and an end through which said filling material may be discharged, the horn being adapted to receive over it a length of casing folded accordion style, apparatus for controlling the passage of the casing along and off the horn, said apparatus comprising first means embracing the horn adjacent its discharge end and adapted to engage the casing adjacent one end of its folded portion to regulate the passage of the casing off the horn during operation of the mechanism, second means at least partially encircling the horn and adapted to engage the casing at a position spaced from said discharge end, and means operatively associated with such second means, and adapted to move said second means longitudinally of the horn to urge the casing along the horn towards said first means, means associated with the horn for feeding filling material into said inlet and causing it to pass through the horn and into said casing, means controlled by said second means for stopping the passage of filling material through the horn when the casing has advanced a predetermined distance towards the discharge end of the horn, and means for adjusting the position at which the stopping means is operated.

11. Stuffing mechanism for sausage and the like casing, comprising a horn through which casing filling material may pass, the horn having an inlet into which the filling material may be fed and an end through which said filling maetrial may be discharged, the horn being adapted to receive over it a length of casing folded accordion style, apparatus for controlling the passage of the casing along and off the horn, said apparatus comprising means embracing the horn adjacent its discharge end and adapted to engage the casing adjacent one end of its folded portion to regulate the passage of the casing off the horn during operation of the mechanism, and a spring having a bend intermediate its ends and having one end secured relative to the horn and another end at least partially encircling the horn and adapted to engage the casing at a position spaced from said discharge end and urge the casing along the horn towards said embracing means, means associated with the horn for feeding filling material into said inlet and causing it to pass through the horn and into the casing, a valve member associated with the horn for stopping the passage of filling material through the horn to the casing, spring means associated with the valve and tending to close the valve, a latch associated with the valve member and adapted to engage the valve member to hold it in the open position, and a spring-urged member for retaining the latch in engagement with the valve, said spring urged-member being engageable by said casing urging spring to turn off the valve when said urging spring has advanced said casing to a predetermined position on the horn.

References Cited in the file of this patent
UNITED STATES PATENTS

| | | |
|---|---|---|
| 688,447 | Steyermark | Dec. 10, 1901 |
| 1,292,645 | Reisfeld | Jan. 28, 1919 |
| 1,366,183 | Hottmann | Jan. 18, 1921 |
| 1,790,868 | Knoll | Feb. 3, 1931 |